May 16, 1967  C. F. STEARNS  3,319,641
SPEED SETTING MECHANISM AND TRIMMING MEANS THEREFOR
Filed April 27, 1964  3 Sheets-Sheet 1

INVENTOR
CHARLES F. STEARNS
BY Norman Friedland
ATTORNEY

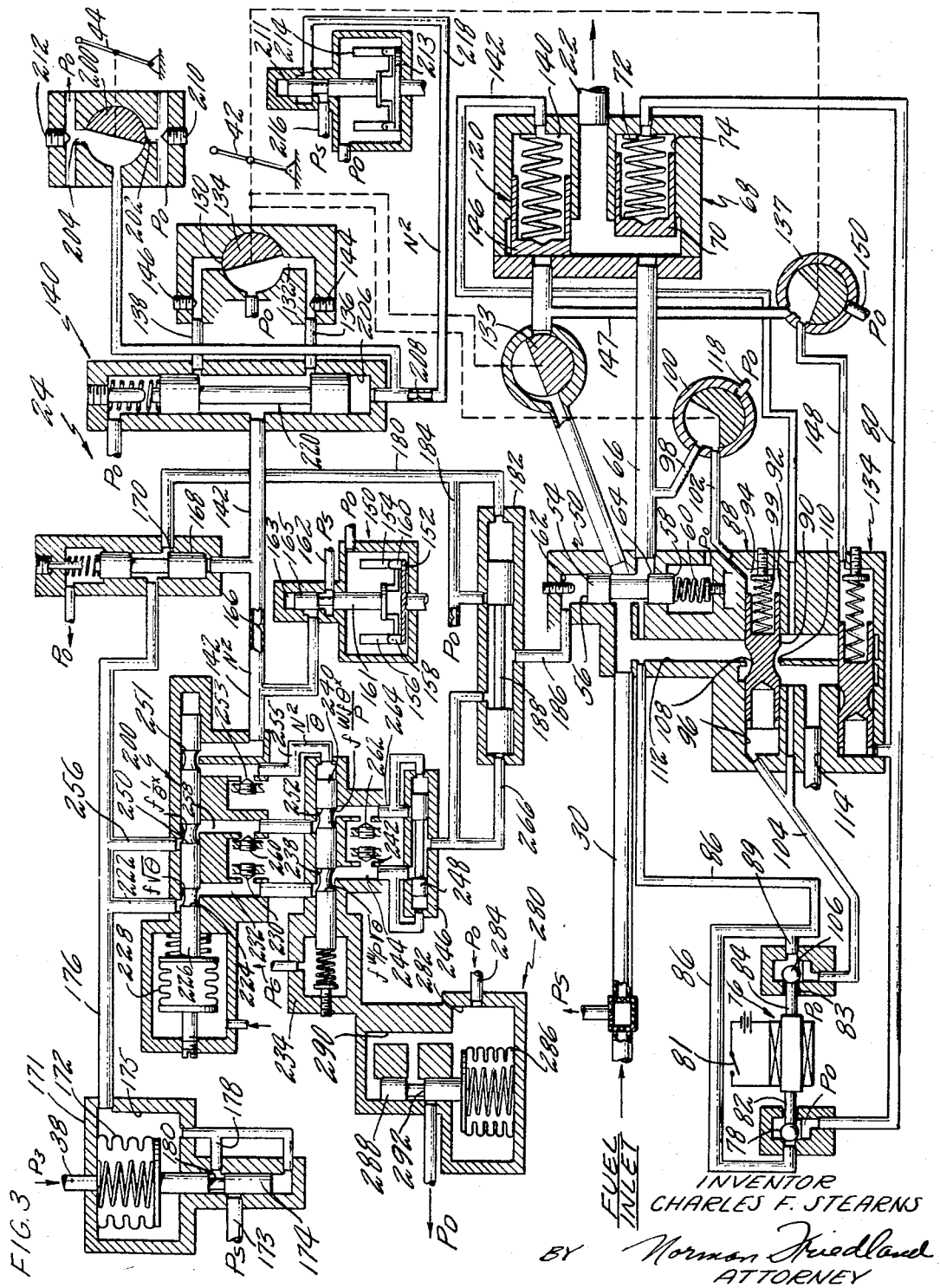

May 16, 1967 C. F. STEARNS 3,319,641
SPEED SETTING MECHANISM AND TRIMMING MEANS THEREFOR
Filed April 27, 1964 3 Sheets-Sheet 3
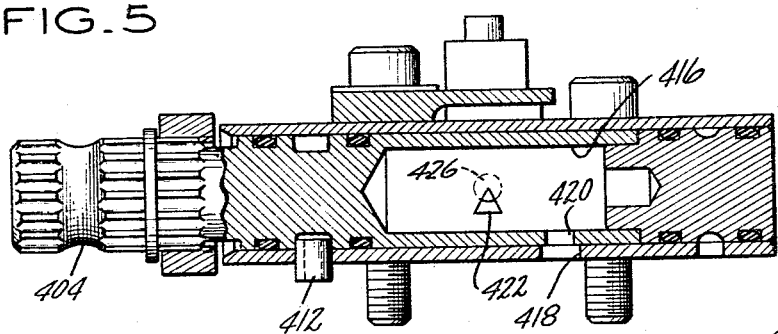
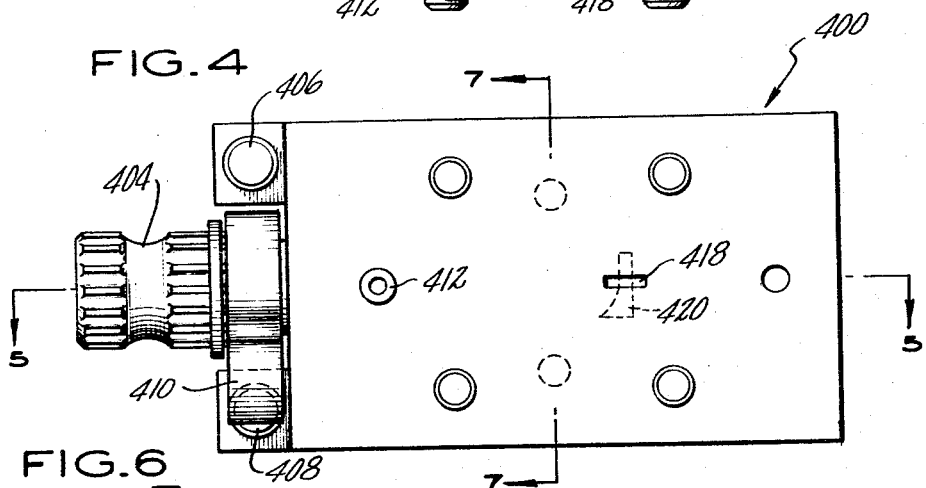
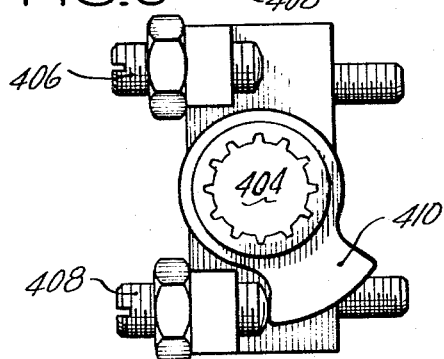
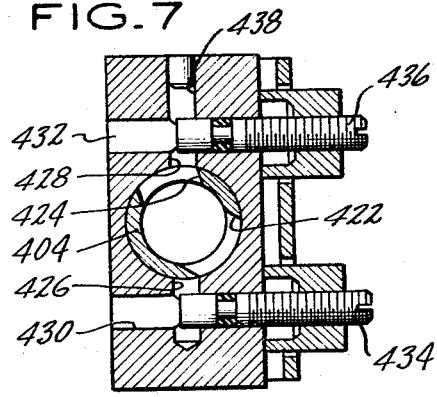
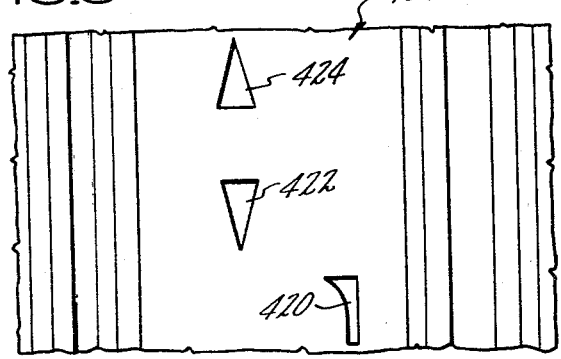
INVENTOR
CHARLES F. STEARNS
BY Norman Friedland
ATTORNEY

United States Patent Office 3,319,641
Patented May 16, 1967

3,319,641
SPEED SETTING MECHANISM AND TRIMMING MEANS THEREFOR
Charles F. Stearns, East Longmeadow, Mass., assignor to United Aircraft Corporation, East Hartford, Conn., a corporation of Delaware
Filed Apr. 27, 1964, Ser. No. 362,881
7 Claims. (Cl. 137—18)

This invention relates to fuel controls and particularly to trimming means for adjusting the fuel flow for synchronizing it with the position of the power lever so that a particular power lever position will produce a predetermined engine speed.

As is generally understood in the fuel control art, it is necessary to trim the speed setting mechanism to adjust the flow of fuel to the engine so that a particular setting of the power lever will produce a predetermined power plant speed. In order to meet this requirement the fuel control generally contains mechanical adjusting means which allows a test rig operator to adjust the speed setting mechanism in order to trim or "zero in" the fuel flow at a predetermined speed for a given power lever setting prior to asembling it to the aircraft engine. The heretofore known fuel controls customarily contained two such mechanical adjustments in order to allow the operator to "zero in" the speed for two judicious operating points in the speed regime. The points selected are usually the normal maximum speed setting (sometimes referred to as the military speed setting) and idle speed setting which is some percentage less than the normal maximum speed. In these heretofore known fuel controls the general practice is to provide externally accessible mechanical idle and military trims taking the form of a pair of adjusting screws which serve to adjust a single lever. This lever, in turn, connects to the speed setting lever for repositioning it in order to reset the throttle valve position. In this manner the fuel control would control the engine at a given speed for each judicious setting of the power lever. An example of such heretofore known trimming devices may be had by referring to U.S. Patent No. 3,129,643 granted to Robert D. Porter and Charles F. Stearns.

In these heretofore known trimming devices, since both set screws reset a single linkage member, it was necessary to reset both of the set screws even when only one setting was changed. Obviously, this was a cumbersome operation for the test rig operator to calibrate the fuel control since he had to keep resetting both adjustments to finally calibrate the control for both settings. That is to say, the rig operator would calibrate the control by first adjusting one screw to "zero in" the speed, and then adjust the other to "zero in" the other speed. Then it became necessary to reset the first speed, since the resetting of the second speed altered the setting of the first speed, and so on until the fuel control was finally calibrated for both speeds.

I have found that I can obviate this cumbersome trimming procedure by constructing the trimming device so that the idle trim is made independent of the military trim; that is to say, each trim setting is independent of each other.

It is, therefore, an object of this invention to provide a military and idle trimming means which are capable of being set independently of each other.

It still is a further object of this invention to provide trimming means of the speed setting hydraulic network for setting the idle and military speeds by creating a pressure as a function of speed and power lever position.

A still further object of this invention is to provide means for trimming the idle and military speed of a speed setting mechanism of the hydraulic type so as to obtain a continuous and smooth pressure gradient for the complete travel of the power lever.

Other features and advantages will be apparent from the specification and claims and from the accompanying drawings which illustrate an embodiment of the invention.

FIG. 3 is a schematic illustration of a fuel control mechanism utilizing this invention.

FIG. 4 is a plan view of the speed setting mechanism including the trimming adjustments.

FIG. 5 is a sectional view taken along lines 5—5 of FIG. 4.

FIG. 6 is an end elevation of the structure shown in FIG. 4.

FIG. 7 is a sectional view taken along lines 7—7 of FIG. 4.

FIG. 8 is a developed view showing the orifice shapes utilized to produce the desired speed set pressure gradient.

Shown in its preferred embodiment the present invention is utilized with a hydraulic fuel control. However, it is to be understood that this invention may be employed with other types of fuel controls and that the scope of the invention is not intended to be limited thereto. The hydraulic type of fuel control is designed to sense various engine operating conditions and compute their value to obtain the proper fuel flow necessary to give optimum engine performance. The function of the fuel control is to produce pressures indicative of the operating parameters sensed in order to establish a signal which will control the throttle valve. The speed sensing mechanism therefore establishes a pressure which is indicative of the power lever setting and this pressure signal combined with the speed signal determines the desired speed which the pilot wishes to obtain when he positions the pilot lever. As was indicated above, prior to installing the fuel control on the engine, it is necessary to calibrate it so that for a particular power lever setting there will be a particular speed at which the power plant will be controlled. The test rig operator in calibrating the fuel control merely adjusts a pair of set screws for establishing the required pressure.

Figure 1:
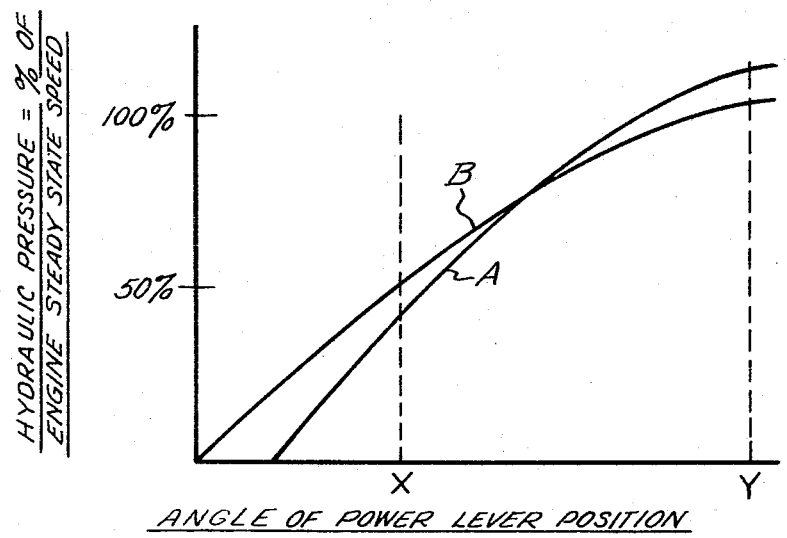
FIG. 1 is a graphical representation showing a plot of speed of the power plant versus power lever position and showing the pressure developed by the speed setting mechanism.

A better understanding of this invention can be had by referring to FIG. 1 which shows the speed range established by positioning the power lever and the particular speed which will be obtained by a particular power lever position. As noted, Curve A illustrates the pressure gradient produced by the power lever setting mechanism prior to trimming or "zeroing in" the speed and Curve B illustrates the pressure gradient created by the power setting network after the speed is "zeroed in." It will be appreciated from a visual inspection of this graph that the curvature of the arc of Curve A is identical to the arc of Curve B which is made possible by the present invention. It also will be noted that the transitional point from the no power position to the full power position is substantially a smooth curve. This smooth curve is necessary to give the pilot the proper "feel" of the power lever so that he will have a good indication what speed he has selected when he moves the power lever. If, for example, there was an abrupt change in speed for a smooth change in power lever position, the change in the operating speed of the engine would be dissimilar to the change in the power lever position which, in essence, would produce a rough "feel" which is undesirable from a pilot's standpoint. Thus, it is necessary to assure that the rate of change of speed will be similar or proportional to the rate of change of the power lever position.

The following description will consider the speed setting mechanism and the attendant trimming means as utilized on a hydraulic fuel control.

Figure 2:
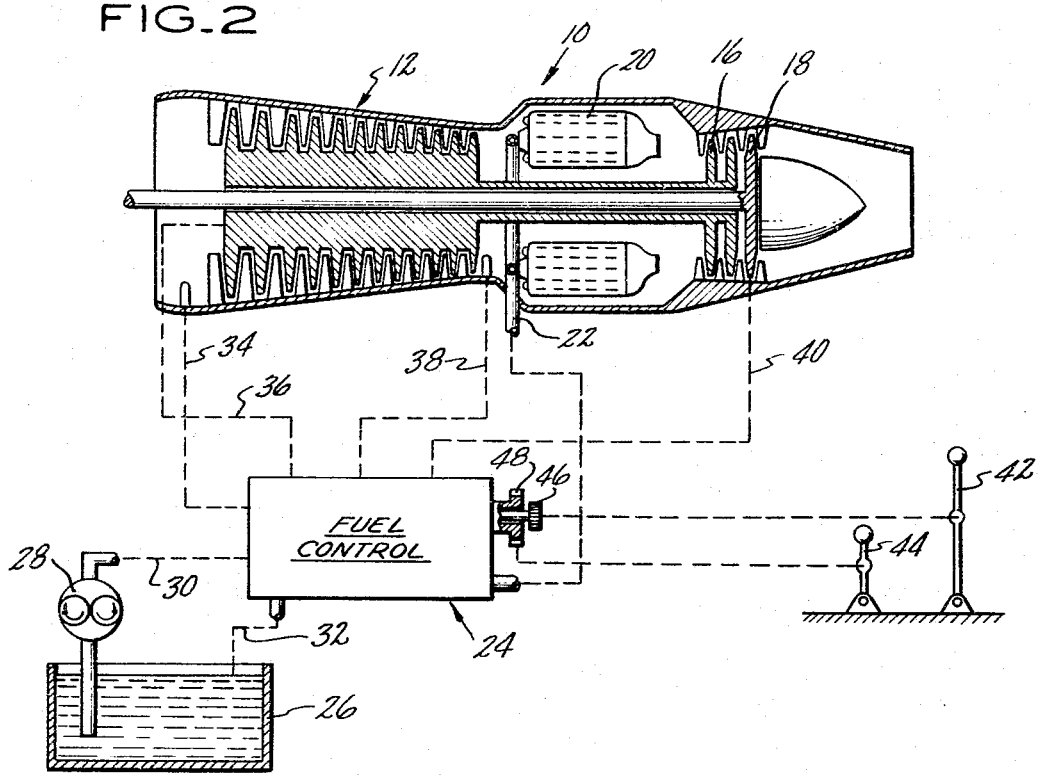
FIG. 2 is a schematic illustration showing a fuel control connected to a free-turbine type of gas turbine engine.

Referring now to FIG. 2 showing a gas turbine engine generally illustrated by numeral 10 having a first section 12, wherein the compressor is driven by turbine section 16. Since the turbine 16 is connected to compressor 12 for driving the same, it is generally referred to as the gas generator turbine and the rotational speed thereof is hereinafter referred to as $N_g$. Turbine 18 illustrates a free turbine which may be adapted to drive a variable load such as a helicopter rotor, propeller and the like. Since turbine 18 is mechanically disconnected from turbine 16 but is driven by the discharging gases thereof and because it is free or has only an aerodynamic connection with the turbines in the first turbine section, it is generally referred to as the free turbine and the speed thereof is hereinafter referred to as $N_f$. Interposed between the compressor section and the turbine section is the burner section generally indicated by numeral 20. Fuel is injected into the burner section through the fuel manifold 22 which is regulated by the fuel metering section generally indicated by numeral 24 to be described hereinbelow.

Basically, the fuel metering system of the fuel control serves to meter fuel to the engine in an amount commensurate with optimum engine operations while assuring that malfunctions due to surge, overtemperature or rich or lean blow out do not ensue. Fuel is fed to fuel control 24 from reservoir 26 and the pressure thereof is increased by virtue of pump 28 through line 30. The fuel control also contains a drain manifold which discharges excessive fuel or ported fuel to drain via line 32.

The fuel control also contains a computing system which measures certain parameters, computes them in accordance with the control parameters indicated in the above for controlling the fuel metering system. For this purpose, compressor inlet temperature is sensed via line 34, compressor speed ($N_g$) is sensed via line 36, compressor discharge pressure ($P_{t3}$) is sensed via line 38 and free turbine speed ($N_f$) is sensed via line 40. It is to be understood that any suitable mechanism for sensing these various operating conditions of the engine is contemplated within the scope of this invention. Power levers 42 and 44 are suitably situated in the cabin of the aircraft and are available to the pilot for setting the speed of the gas generator and the speed of the free turbine in a manner to be described hereinbelow. These control levers also serve to operate various other mechanically movable parts in the fuel control, also to be described hereinbelow. Thus, lever 42 rotates gear 46 which rotates the connecting shaft and lever 44 rotates gear 48 which rotates its connecting rotary shaft.

While the fuel control showing the preferred embodiment is illustrated in connection with a free turbine type of gas turbine engine, it is to be understood that this invention has applications as will become obvious to one skilled in the art in connection with all types of gas turbine engines. As is known in this art, the free turbine can operate at a different speed than the gas generator. By virtue of this fact, it is often desirable to measure $N_f$ as well as $N_g$. If, however, it is desirable to utilize this invention in connection with a solid shaft or a coupled type of gas turbine engine, it would only be necessary to sense the speed of one of the rotating mechanisms within the engine. In this event, the free turbine speed sensor which will be described hereinbelow would not be utilized.

It is also to be understood and will be obvious to one skilled in the art that the terminology of power lever is not particularly limited to the particular lever in the cockpit of the aircraft. Rather, it is intended to cover any linkage connecting the cockpit to the fuel control whether it be referred to as a "go handle," "power lever" or throttle lever or the like.

Now referring to FIG. 3 which is a schematic illustration of a fuel control designated by numeral 24 as having both a fuel metering system and a computing system. Fuel is admitted to the throttle valve generally indicated by numeral 50 via inlet or supply line 30. Throttle valve 50 comprises spool 54 having a fluid reaction end 56 and a combined pressure and a spring reaction end 58. Adjustable spring 60 acts against end 58 while fluid admitted into chamber 62 acts against end 56 and obviously the force generated by the pressure in chamber 62 and the force generated by spring 60 and the pressure acting on end 58 will determine the position of spool 54. Fuel admitted to valve 50 from line 30 is metered by the metering edge 64 on spool 54 into line 22 by way of passage 66 and minimum pressure and shutoff valve generally indicated by numeral 68.

Minimum pressure and shutoff valve 68 comprises valve member 70 urged in one direction by the spring 72. When the value of the pressure acting on the underside or the left-hand end of valve member 70 is sufficient to overcome the force exerted by spring 72 as well as the pressure in chamber 74, the valve member is unseated allowing communication between line 66 and line 22.

As noted from FIG. 3, solenoid 76 normally urges ball valve 78 so that line 80 interconnects chamber 74 with drain pressure $P_o$ so that drain pressure and the force of spring 72 act on one end of valve member 70 opposing the force of the metered fuel discharging from line 66. Solenoid 76 may be actuated by the pilot by depressing button 81 which conducts electrical current to actuate the plungers 82 and 84. Plunger 82 in this instance would move to the right seating ball 78 against the drain line, interconnecting line 80 and line 86. This serves to direct pressure upstream of throttle valve 50 behind valve element 70 for urging this valve in the closed position for changing to the emergency engine fuel flow.

So that the displacement of valve 50 and metering edge 64 is directly proportional to the fuel passing therethrough, pressure regulator valve generally indicated by numeral 88 is employed. Valve 88 comprises a spool 90 mounted in cylinder 92 defining a pair of opposing chambers 94 and 96. Disposed in chamber 94 is adjustable spring 99. Fluid upstream and downstream of throttle valve 50 is admitted to chambers 94 and 96 through line 98, valve 100 and line 102 in one instance and line 104, ball valve 106 and lines 86 and 89 in the other instance. It will be noted from the drawing that valve 106 is seated on the left end blocking flow between drain and line 104 while admitting pressure upstream of 50 into chamber 96.

From the foregoing, it is apparent that valve member 90 is subjected to upstream and downstream pressure together with the force exerted by spring 99. This serves to position the metering portion 108 relative to orifice 110. This orifice and metering element 108 serve to bleed pressure fluid upstream of valve 40 through line 112 into line 114 and eventually back to the reservoir, bypassing the throttle valve. Thus, it is apparent that the pressure drop across throttle valve 50 is maintained at a constant value, which value is determined by the force or the strength of spring 99. In the event a deviation of the desired pressure drop is evidenced, valve element 90 will move relative to the metering edge 110 for opening or closing said valve and hence increasing or decreasing the rate of flow therethrough for regulating the pressure drop across valve 50 to hold it constant.

It will be noted that valve 100 which is connected to lever 42 and rotated thereby is normally in the open position. By rotating valve 100, fluid in line 102 is ported to drain via line 118. This decreases the pressure in chamber 94 and since the pressure acting on the other end is at a greater value, it permits the valve to move toward the right in the full open position. This bypasses the fuel around the throttle valve and directs the entire fuel back to drain. This completely starves the engine and prevents the fuel from increasing to a pressure whose valve would be above the structural integrity of the components of the fuel control. Overpressurization is occasioned by virtue of the fact that if the engine windmills by virtue of the air passing over the compressor, the fuel pump driven thereby would begin to overspeed and build up the pressure in line 30. What has just been described is the normal or main fuel regulating means of the fuel control. This fuel control may also include an emergency system comprising shutoff valve 120, emergency throttle valve 133, emergency pressure regulating valve 134 and valves 106, 78 and 137 (note, however, that valve 137 is only to shut off the emergency system).

Of course, the emergency fuel control portion is only actuated in the event that the normal fuel control becomes inoperative for one reason or another. In that event, switch 81 is actuated for energizing solenoid 76 for shifting the position of ball valves 78 and 106. This leads fluid from chamber 96 to drain via lines 104 and 83, leads fluid from chamber 140 to drain via lines 142, 104 and 83 while chamber 74 is connected with high pressure via lines 86 and 80 for directing valve member 72 to the closed position. Valve 133 is opened and is directly coupled to lever 42 for metering fluid to the engine through valve 120 and line 22. By virtue of the fact that the pressure underneath the valve element 146 is greater than both the spring force and the pressure in chamber 140, it shifts to the open position allowing the communication between valve 133 and line 22. Further, it will be appreciated that at this time valve 137 is directed to communicate line 148 to line 147 and allowing normally closed emergency pressure regulating valve 134 to open. This valve then serves to control the pressure drop across valve 133. Now that the fuel regulating system has been described, the next portion of the description will be directed to describing the computing mechanism of the fuel control.

As was mentioned above, the position of spool 54 of throttle valve 50 is positioned by the pressure of the fluid in chamber 62. This pressure is made proportional to the desired amount of fuel which will operate the engine at a scheduled value determined by the fuel computing system. The fuel computing system computes steady state and acceleration schedules as will be described hereinbelow. In accomplishing this, levers 42 and 44 are positioned in the desired position to develop the desired amount of thrust or horsepower necessary to propel the aircraft for its desired operation. Referring now to lever 42 which serves to select the predetermined speed setting of the gas generator by virtue of setting the metering area defined by orifices 130 and 132 of valve 134. This serves to set a desired area which will control the pressure in lines 136 and 138 by bleeding fluid to drain. Ignoring for the moment the valve generally indicated by numeral 140, this pressure, in turn, establishes the pressure in line 142. A pair of adjustable orifices 144 and 146 disposed in lines 136 and 138 respectively, serve to provide the idle and topping $N_g$ limits by virtue of the fact that orifice 130 is closed when lever 42 is set for topping and orifice 132 is closed when lever 42 is set for idle.

From the foregoing it is apparent that valve 134 determines a porting area for establishing a pressure in line 142 which is proportional to the desired speed of the gas generator compressor 12. In order to establish a signal to compare the desired speed with actual speed, speed sensor generally indicated by numeral 150 is employed and suitably connected to and driven by compressor 12 for rotating platform 152. The platform contains flyweights 154 and 156 which are pivotally connected to the upstanding members 158 and 160. The arms of the flyweights bear against an end of pilot valve 160. When the flyweights are disturbed from their vertical position resulting from the rotational movement of platform 152, they will either move inwardly or outwardly relative to the rotational axis for positioning valve 160. This, in turn, meters fluid from line 162 to line 142 upstream of fixed restriction 166 proportional to the square of the speed. It will be noted that the pressure in line 142 goes to chamber 163 via annular space 165 made at the lap fit between spool 161 and its cylinder and balances the flyweight force which nulls the valve 161 at the right pressure.

It is apparent from the foregoing that the pressure in line 142 downstream of orifice 166 is a function of the actual speed of the compressor and the desired speed generated by the position of lever 42. This value which is a speed error signal acts on the underside of valve 168 for positioning the metering edge 170.

From the drawing it will be apparent that compressor discharge pressure from line 38 is admitted internally of bellows 172. The free end of bellows 172 acts against pilot valve 174 which serves to regulate pressure in line 176 as a function of compressor discharge pressure. This is accomplished by metering fluid issuing from pressure supply line 173 through passages in spool 174 and into chamber 175 via lines 178. Spool 174 is counterbalanced by the pressure in chamber 175 acting on its underside. Spool 174 translates with respect to the opening 180 until the pressure in chamber 175 acting externally of bellows 172 balances the pressure and the spring acting internally thereof. At the point of equilibrium, the pressure in line 176 is established at the point where it is proportional to compressor discharge pressure plus a constant.

This pressure line 176 is then fed into pilot valve 168 which serves to meter it to line 180. By properly contouring metering edge 170, this pressure is then made a function of the desired fuel flow or $W_f$ for steady state operation. The fluid metered by metering edge 170 is then fed into selector valve 182 via branch line 184 where it is admitted to chamber 62 through line 186 when spool 188 is in the righthand position.

The position of lever 44 serves to generate a signal which will produce a value for establishing the speed at which the free turbine is desired to operate. This is accomplished by the rotation of valve 200 which establishes an area across orifices 202 and 204 venting fluid out of chamber 206 formed in valve 140. This serves to control the pressure drop across restrictor 208 for establishing the desired $N_f$. Adjustable restrictions 210 and 212 downstream of orifices 202 and 204 respectively establish the minimum and maximum speed of the free turbine. The pressure upstream of restrictor 208 is proportional to the square of the speed of the free turbine which is established by pilot valve 210. This valve operates substantially the same as valve 150 by coupling platform 213 to the free turbine shown by line 40 in FIG. 1 so that flyweights 214 responding to this speed positions pilot valve 211. This meters fluid issuing from servo supply line 216 into line 218 in such a manner as to make this pressure proportional to the free turbine speed squared. Hence, the pressure in chamber 206 is established as being the difference between the actual speed generated by pilot valve 211 and the desired speed established by the position of lever 44.

From the foregoing it is apparent that spool 220 is positioned as a function of speed error for modifying the pressure in line 142. This has the effect of resetting the position of spool 168 and hence establishing a new value for the setting of the gas generator or $N_g$. What has just been described is the steady state operation as established by the computing mechanism of the fuel control. The next portion of the description will described the established acceleration surge and overtemperature schedule of the computing mechanism.

As noted from FIG. 3, pressure proportional to compressor discharge pressure is admitted to temperature responsive valve generally indicated by numeral 200 through line 222. The metering edge 224 formed on spool 226 is made to vary as a function of the square root of compressor inlet temperature (the subscript $t$ indicates total temperature value). Compressor inlet temperature admitted to act externally of bellows 228 through line 34 causes it to expand or contract for positioning spool 226 as a function of compressor inlet temperature. By virtue of positioning metering edge 224, the pressure drop across restrictor 230 which bleeds fluid from line 232 to drain is controlled and a multiplication is effectuated so that the pressure in line 232 is made proportional to compressor discharge pressure and a function of the square root of $\theta_{t2}$. This pressure is then admitted to valve 234 which is positioned as a function of the speed $N_g^2/\theta_{t2}$ in the manner to be described hereinbelow. Metering edge 238 of spool 240 is made to define an area which is a function of $W_f/P_{t3}\sqrt{\theta_{t2}}$. The combination of this area and the area established by fixed restrictor 242 serves to effect another multiplication so that the pressure in line 244 is made proportional to the desired fuel flow $W_f$.

The pressure in line 244 is then admitted into selector valve 246 to act on the left end of spool 248 which in this instance is the desired $W_f$ for establishing the surge limit of the schedule. The pressure acting on the right end of spool 248 is the limit in terms of $W_f$ for the temperature limiting portion of the acceleration schedule. This is established by metering lands 250 of spool 226 and 252 of spool 240 in the manner described immediately below.

Fluid pressure proportional to compressor discharge pressure evidenced in line 176 is admitted to the metering land 250 through line 256. This metering land is made a reciprocal function of $\theta_{t2}$ raised to the $x$ power which $x$ power is established according to the thermodynamics of the engine. The value may be ascertained in accordance with the mathematical computations disclosed in my U.S. application Ser. No. 337,904, filed on Jan. 15, 1964 entitled "Fuel Control," and assigned to the same assignee. Hence, the pressure established in line 258 is a multiplication by virtue of metering edge 250 and fixed restriction 260. The area defined by metering edge 250 varies as a function of compressor discharge pressure times a function of $1/\theta_{t2}x$. This fluid is then admitted to valve 234 where metering edge 252 in conjunction with fixed restriction 262 serves to effect another multiplication. Since the area defined by metering edge 252 is a function of $W_f/P_{t3}$ times $\theta_{t2}x$, the pressure in line 264 is proportional to the desired fuel flow ($W_f$) for limiting temperature. It will be appreciated that the position of this valve is varied as a function of $N_g^2/\theta_{t2}$ which has been established by metering edge 251 of spool 226. It will be appreciated that pressure generated by pilot valve 161 is made proportional to $N_g^2$, which, in turn, is fed to line 142 and admitted to metering edge 251. By virtue of metering edge 251 and fixed restriction 253 a division is effectuated so that the pressure in line 255 is made proportional to $N^2/\theta_{t2}$ which, in turn, acts on the left end of spool 240.

This fluid in line 264 is then admitted to selector valve 246 to act on the right-hand end of spool 248. The difference between the two values of the pressures acting on either end of spool 248 determines the position of spool 248 to either the left or right for admitting fluid into line 266. Hence, the pressure in line 266 is either the desired $W_f$ surge or the desired $W_f$ temperature depending on the position of selector spool 248 of selector valve 246. This pressure is then admitted to act on the left end of spool 188. As mentioned above, steady state pressure proportional to the desired fuel flow ($W_f$) acts on the right-hand end. The difference between the two values will position spool 188 to either the left or right. The pressure proportional to the desired steady state $W_f$ or the desired surge $W_f$ or the desired overtemperature $W_f$ is then admitted to chamber 62 for controlling the position of spool 54 of throttle valve 50.

Since it is desirable to compute the terms of the parameters in absolute values rather than gauge pressure values, absolute pressure control 280 is employed. Fluid from the various computating valves and restrictions which is eventually ported to drain is first admitted into chamber 282 via line 284 where it acts externally of bellows 286. Bellows 286 is evacuated and has its free end operatively connected to one end of spool 288. Since the other end of spool 288 is counterbalanced by the pressure admitted thereto through line 290 metering edge 292 thereof will assume a position to establish the drain pressure for establishing an absolute value datum line. Note that the pressure level is set equal to the spring constant established in valve 171. Therefore, it will be appreciated that the datum line is equivalent to an absolute value so that the pressure control valves use a zero pressure datum rather than a gauge pressure datum.

Now that the present invention has been described in connection with the hydraulic fuel control, due consideration will be given to the details of the speed setting mechanism and its attendant trimming device.

Now, referring generally to FIGURES 4 through 7 which generally show the speed setting mechanism as indicated by numeral 400, comprising an outer casing 402 and an elongated rotatable valve element 404 extending in a bore centrally formed in casing 402. A pair of circumferentially spaced set screws 406 and 408 are adapted to engage and bear against the end surfaces of stop 410 carried by element 404 in order to limit the rotational movement of the rotating valve element 404. Pin 412 projects into the casing and engages an annular recess 414 circumscribed around the periphery of valve element 404 for permitting rotary motion and restraining axial movement. The end of the valve element extends beyond the casing and may be suitably machined to engage linkage or gear or spline mechanism connecting it to the pilot lever located in the cockpit of the aircraft. Bore 416 is centrally formed on the other end of valve element 404, and communicates with port 418 formed in casing 402 and orifice 420 formed in valve element 404. Fluid in bore 416 is bled therefrom through the triangular shaped orifices 422 and 424 formed in valve element 404 which sequentially registers with a pair of ports 426 and 428 respectively formed in casing 402. Hence, rotation of valve element 404 communicates orifices 422 and 424 with ports 426 and 428 respectively. A pair of drilled passages 430 and 432 intersecting ports 426 and 428 respectively serve to deliver pressurized fluid to the hydraulic fuel control. A pair of adjusting members 434 and 436, suitably supported in the casing project in passages 430 and 432 respectively and serve to vary the discharge area of ports 426 and 428 respectively. A portion of the fluid as was described above is directed to drain through drilled passage 438. As was noted above, the area established by adjusting members 434 and 436 with the respective cooperating ports and the area established by the inlet orifice 420 establish the pressure discharging through drilled passages 430 and 432.

Looking for the moment at FIG. 3, drilled passages 430 and 432 connect to lines 136 and 138 respectively for delivering the desired pressure, indicative of the position of lever 42, to the computing system of the fuel control.

As was mentioned above, the sizing of the orifices formed in the valve element 404 is important to establish the proper pressure gradient created by rotating the power lever through its complete travel. Referring to FIG. 8, showing valve element 404 as it would appear if it were unwrapped, orifices 422 and 424 are triangularly shaped and orifice 420 is generally L shaped.

What has been shown by this invention is a speed setting mechanism which is characterized as being simple to manufacture, highly reliable, yet capable of rugged use which serves to establish a pressure indicative of the position of the power lever. Adjustment members 434 and 436 which are externally accessible serve to trim the flow metered by valve element 404 in order to establish the proper pressure at the idle and military speeds for given positions of the power lever. Each of the adjustments can be varied without affecting the adjustment of the other, because the triangular ports 424 and 422 are so sequenced that, at the points of trim, the only adjustment in the network is the one that is requiring trimming. It is obvious then that any trimming of the adjustment not in use cannot affect the one in use. Hence, the military and idle trim settings may be made independently of each other so that adjustment of one will not affect adjustment of the other.

It should be understood that the invention is not limited to the particular embodiments shown and described herein, but that various changes and modifications may be made without departing from the spirit or scope of this novel concept as defined by the following claims.

I claim:

1. For a fuel control adapted to control the rotational speed of a rotating member in a power plant, a pilot lever, means connected to said pilot lever including a first orifice, a second orifice and a third orifice establishing a signal equivalent to the position of the pilot lever, said first orifice being serially connected to said second orifice when said rotating member is rotating at a first predetermined speed, and said first orifice being serially connected to said third orifice when said rotating member is at a second predetermined speed, adjusting means in said third and second orifices adapted to vary the area thereof for independently resetting said signal at said first predetermined speed and said second predetermined speed.

2. For a fuel control adapted to control the rotational speed of a rotating member in a power plant, a source of hydraulic fluid under pressure, a pilot lever, speed selecting means connected to said pilot lever including valve means having a first orifice, a second orifice and a third orifice for establishing a signal equivalent to the position of the pilot lever, said first orifice communicating with said source for sequentially leading fluid to said second orifice when said rotating member is rotating at a first predetermined speed, and then to said third orifice when said rotating member is at a second predetermined speed, adjusting means in said third and second orifices adapted to vary the area thereof for resetting said signal at said first predetermined speed and said second predetermined speed.

3. For a fuel control adapted to control the rotational speed of a rotating member in a power plant, a source of fluid under pressure, a pilot lever, means connected to said pilot lever including a first orifice, a second orifice and a third orifice establishing a signal equivalent to the position of the power lever, said first orifice communicating with said source for leading fluid to said second orifice when said rotating member is rotating at a first predetermined speed, and then to said third orifice when said rotating member is at a second predetermined speed, a drain, passage means interconnecting said second orifice and drain and said third orifice and drain, adjusting means in said second and third orifices adapted to vary the area thereof for resetting said signal at said first predetermined speed and said second predetermined speed.

4. For a fuel control for controlling a power plant, a speed setting device comprising a casing having an inlet port and first and second outlet ports, a rotary valve element in said casing having a generally L shaped orifice communicating with said inlet port, a pair of generally Δ shaped orifices in said valve element, passage means in said valve element interconnecting said L shaped orifice and said pair of Δ shaped orifices, means for imparting rotary motion to said valve element so as to sequentially communicate one of said Δ shaped orifices with said first outlet port and then said other Δ shaped orifice with said second outlet port.

5. For a fuel control for controlling a power plant, a speed setting device comprising a casing having an inlet port and first and second outlet ports, a rotary valve element in said casing having a generally L shaped orifice communicating with said inlet port, a pair of generally Δ shaped orifices in said valve element, passage means in said valve element interconnecting said L shaped orifice and said pair of Δ shaped orifices, means for imparting rotary motion to said valve element so as to sequentially communicate one of said Δ shaped orifices with said first outlet port and then said other Δ shaped orifice with said second outlet port, and adjusting means adjacent each of said Δ shaped orifices for varying the area thereof.

6. For a fuel control for controlling the rotational speed of a rotating member of a power plant, a pilot lever, a speed setting device comprising a casing having an inlet port, a pair of generally Δ shaped orifices in said valve element connected to said pilot lever in said casing having a generally L shaped orifice communicating with said inlet port, a pair of generally Δ shaped orifices in said valve element, passage means in said valve element interconnecting said L-shaped orifice and said pair of Δ shaped orifices, means for imparting rotary motion to said valve element so as to sequentially communicate one of said Δ shaped orifices with said first outlet port when said rotating member is rotating at one predetermined speed and then said other Δ shaped orifice with said second outlet port, when said rotating member is rotating at a second predetermined speed, and speed trimming means for synchronizing the position of said pilot lever with said speed setting device, said trimming means including a first mechanical adjusting member mounted adjacent said second orifice for varying the area thereof and a second mechanical adjusting member mounted adjacent said third orifice for varying the area thereof.

7. For a fuel control for controlling a power plant, a speed setting device comprising a casing having an inlet port and a first and second outlet port, a rotary elongated cylindrically shaped element mounted in said casing having a generally L shaped orifice and a pair of generally Δ shaped orifices, said L shaped orifice being mounted adjacent said inlet port, a bore formed in said cylindrically shaped element providing communication between said L shaped orifice and said pair of Δ shaped orifices, means for imparting rotary motion to said cylindrically shaped element so as to sequentially communicate one of said Δ shaped orifices with said first outlet port and then said other Δ shaped orifice with said second outlet port, and adjusting means for varying the area of said first and second outlet ports.

References Cited by the Examiner

UNITED STATES PATENTS

| | | | |
|---|---|---|---|
| 2,323,115 | 6/1943 | Bryant | 137—36 X |
| 3,213,763 | 10/1965 | Pearson | 137—36 X |

FOREIGN PATENTS

| | | |
|---|---|---|
| 471,915 | 2/1929 | Germany. |
| 677,249 | 8/1952 | Great Britain. |

CLARENCE R. GORDON, *Primary Examiner.*

UNITED STATES PATENT OFFICE
CERTIFICATE OF CORRECTION

Patent No. 3,319,641                                                  May 16, 1967

Charles F. Stearns

It is hereby certified that error appears in the above numbered patent requiring correction and that the said Letters Patent should read as corrected below.

Column 10, line 22, strike out "port, a pair of generally Δ shaped orifices in said valve ele-" and insert instead -- port and first and second outlet ports, a rotary valve ele- --.

Signed and sealed this 28th day of November 1967.

(SEAL)
Attest:

Edward M. Fletcher, Jr.                                    EDWARD J. BRENNER
Attesting Officer                                                 Commissioner of Patents